United States Patent Office 3,361,828
Patented Jan. 2, 1968

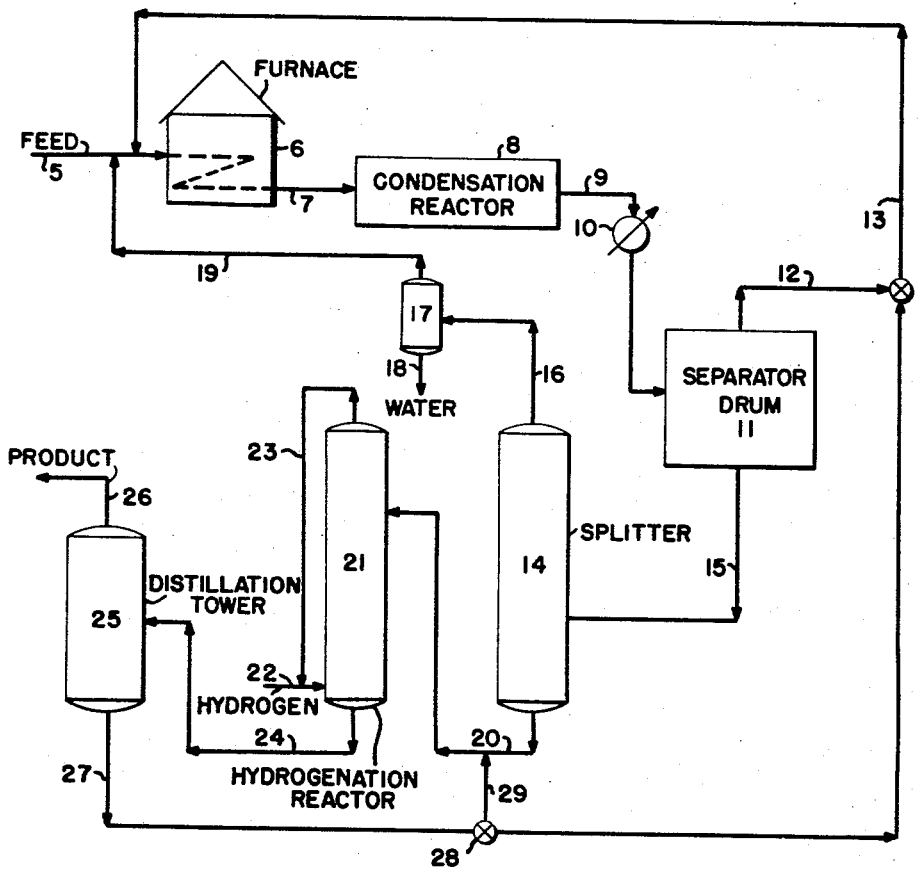

3,361,828
PREPARATION OF HIGHER MOLECULAR WEIGHT KETONES
Leroy Virgil Robbins, Jr., and Walter James Porter, Jr., Baton Rouge, La., assignors to Esso Research and Engineering Company, a corporation of Delaware
Filed Jan. 2, 1962, Ser. No. 163,834
7 Claims. (Cl. 260—593)

The present invention relates to a process for preparing ketones from oxygenated compounds. More particularly the invention concerns the use of unsupported catalyst particles in the conversion of low molecular weight secondary alcohols and/or ketones, such as acetone and isopropanol, to higher molecular weight ketones, such as mesityl oxide. Specifically, the invention involves carrying out the aforementioned conversion in the presence of a pilled or extruded catalyst comprising a Group II metal oxide, especially zinc oxide.

It is known that ketones can be condensed in the vapor phase at elevated temperatures to form higher molecular weight ketone condensation products. For instance, acetone has been condensed with itself in the presence of a supported zinc oxide-zirconium oxide catalyst to form mesityl oxide, an unsaturated ketone. Mesityl oxide can, of course, be readily hydrogenated in the presence of a suitable catalyst, such as nickel, at 140 to 270° F. under 1 to 25 atmospheres of hydrogen to make methylisobutyl ketone (MIBK). Both of these higher molecular weight ketones, especially mesityl oxide, are useful as solvents for many organic substances, such as vinyl resins, polyacrylic esters and organic salt resins.

One difficulty which has been encountered in this vapor phase process is the relatively low conversion of the lower molecular weight ketone feed to the higher molecular weight ketone product in the reaction when supported catalysts are used. Supported zinc oxide is particularly unsatisfactory in this regard. Low conversion rates require separating large quantities of ketone feed from the product and recycling it to the reaction zone.

It has now been surprisingly discovered that excellent selectivities and high conversions of lower molecular weight secondary alcohols and/or ketones to higher ketones can be obtained by employing certain unsupported catalysts, i.e. extruded or pilled catalysts. Moreover, feeding hydrogen into the condensation reactor substantially increases the amount of higher ketone formed per pass. The preferred catalyst contains zinc oxides as the only active ingredient. However, activators, such as the oxides of thorium, cerium and zirconium, can be used if desired.

The drawing is a flow diagram of a preferred embodiment of the invention.

In carrying out one embodiment of the invention, which can be a batch or continuous process, a vaporized feed comprising a low molecular weight saturated acyclic hydrocarbyl ketone or secondary alcohol preferably having a boiling point between about 120 and 185° F. is introduced into a reaction zone containing a pilled catalyst consisting essentially of a Group II–B metal oxide, preferably zinc oxide. If the feed is a secondary alcohol it is of course first dehydrogenated to the corresponding ketone which then condenses with itself. The ketone or alcohol should be preheated so that it enters the reaction zone in the form of a vapor at approximately the reaction temperature. It has been found that the best results are obtained with a fixed catalyst bed in an isothermal or an adiabatic reactor, such as that described in U.S. Patent 2,835,706 issued to C. E. Cordes. The pressure in the reactor should be maintained at about 0.5 to 5 atmospheres and the temperature between about 300 and 700° F. While temperatures up to 900° F. may be employed, the catalyst activity is adversely affected at these temperatures due to the deposit of higher molecular weight by-products, such as isophorone, on the surface of the catalyst. The surprisingly high activity of the unsupported catalyst makes it possible to effect the condensation reaction at temperatures that are substantially below that required for supported catalysts without adversely affecting the product yield. The low reaction temperature reduces, and in some instance substantially eliminates, catalyst fouling. Adiabatic reactors are preferred because they are simpler to operate and maintain, both mechanically and processwise, than the typical isothermal reactors which have multiple tubes and direct firing. Moreover, they prevent the occurrence of hot spots which cause coke formation on the catalyst. The optimum conditions for effecting the condensation are temperatures of 500 to 600 or 700° F. and atmospheric pressure. It has been found that low feed partial pressures and/or high velocities favor the reaction. While the space velocity is not critical, it is generally advantageous to pass the feed through the reaction zone at a space velocity based on liquid feed on 0.10 to 5 v./v./hr.

The catalyst particles are usually small, having an average diameter of between about $\frac{1}{32}$ to $\frac{1}{2}$ inch. The particles may have a variety of shapes, such as cylindrical, round, cubical, etc. Their density should be at least 1.0 g./cc.

Increased yields of higher molecular weight ketone product, both saturated and unsaturated, are obtained when hydrogen is introduced into the reaction zone either separately or admixed with the vaporized feed. The amount of hydrogen introduced into the reaction zone should be carefully controlled. It has been found that when the molar ratio of hydrogen to ketone feed exceeds 3:1 the conversion to higher ketone is reduced. However, this may be offset by the increased life which accompanies the use of hydrogen. Where the feed is acetone, it generally is best to use about 2 moles of hydrogen per mole of feed, although as little as 1 mole or as much as 4 or 5 moles of hydrogen has a pronounced effect on the catalyst life. The hydrogen not only results in the production of some saturated ketone and improved catalyst life, but it also significantly increases the yield of unsaturated ketone product, e.g. mesityle oxide.

As mentioned above, the condensation catalyst may contain an activator which can be present in amounts as little as 1 wt. percent or as much as 30 wt. percent activator. When an activator is used it is generally best to use more than 15 wt. percent, e.g. a catalyst consisting of 16 to 20 wt. percent zirconium oxide and 80 to 84 wt. percent zinc oxide has been found to be quite satisfactory. Aside from zinc oxide, other metal oxides such as beryllium oxide and magnesium oxide, can be employed as catalyst, but these are less desirable substitutes. Also, as mentioned above, other activators, such as titanium oxide, cerium oxide and thorium oxide, may be used in place of zirconium oxide.

It is not necessary, however, to employ an activator and in fact it is advantageous from an economic point of view not to use one. Thus in a broad sense the amount of activator in the catalyst can range from 0 to 30 wt. percent with the Group II metal oxide making up the balance of the active ingredients.

Any suitable manner for preparing the catalyst may be employed, such as mixing and comminuting the oxides to form a homogeneous powder and then compacting or pressing the finely comminuted catalyst into pellets of the desired shape. If the pellets do not have sufficient strength, a small amount of binder, such as cement or clay, may be added to the mixture prior to pressing it into pellets. For example, 1 to 15 parts by weight of a conventional catalyst binder may be admixed with 100 parts by weight of the catalyst before the catalyst is pilled. The surface area of the catalyst, which is usually about 1 to 4 sq. meters/g., may be substantially increased by admixing about 3 to 15 parts by weight of a combustible material, such as graphite, coke or other substance, and burning out the combustible material from the catalyst pellets. This may be accomplished by heating the catalyst in the presence of air or oxygen at high temperatures, e.g. about 1000° F. The catalyst may be pilled in any conventional press, such as a rotary press, or it may be extruded from an extrusion machine. If desired, the surface may be increased by crushing the catalyst particles until they are about 5 to 15 mesh (ca. ⅛ to ³⁄₆₄ inch).

The catalyst pellets are more dense than the supported catalysts (about 2.5 times as dense as char base catalyst) and have a longer life. For instance, pilled catalysts can stay on stream for many months without regeneration, while supported catalysts have a relatively short life, i.e. about 1 month, and are sometimes difficult to regenerate. The pilled catalysts can be regenerated by simply heating them to about 700 to 1200° F. in the presence of air to burn off contaminants.

The reaction products of the condensation step comprise mainly unsaturated higher molecular weight ketones, such as mesityl oxide, and minor amounts of saturated aliphatic and cyclic ketones, such as methylisobutyl ketone, phorone and isophorone. The conversion of a lower ketone to a higher molecular weight ketone with fresh catalyst pellets is generally greater than 10%, and at space velocities of 0.25 to 0.75 v./v./hr. (volume of liquid feed/volume of catalyst/hour) it may be as high as 30 or 35%. Lower conversion rates, i.e. 12 to 15%, should be used where catalyst life is important.

While acetone is the preferred feed for this reaction, secondary monohydric alcohols, especially isopropanol, and other oxygenated organic compounds, preferably saturated aliphatic compounds having 3 to 6 carbon atoms, such as methylethyl ketone, methylpropyl ketone and methylbutyl ketone, may be used to prepare higher unsaturated carbonyl compounds which can be hydrogenated to form corresponding saturated ketones.

If an alcohol, such as isopropanol, is used as the feed, the first reaction is a dehydrogenation to make the corresponding ketone which is then condensed to form higher molecular weight ketones. When the pure acetone is fed into the reactor, some isopropanol is formed in the condensation zone. The formation of alcohol can be suppressed by introducing an equilibrium amount of isopropanol with the acetone feed. The suppression of alcohol formation favors the formation of the desired condensation product.

The reaction products of the condensation step, withdrawn from the reaction zone, are separated by any suitable technique such as fractional distillation. Any uncondensed feed, e.g., acetone, is recycled to the condensation reaction zone. The unsaturated ketone product, e.g. mesityl oxide, is then converted to saturated ketone product by introducing it into a hydrogenation zone which is at 140° to 400° F. and under 1 to 25 atmospheres of hydrogen pressure, hydrogenating the feed in the presence of a suitable hydrogenation catalyst, such as nickel, cobalt molybdate or copper chromite, and recovering the saturated ketone, e.g. by distillation.

In the synthesis of methylisobutyl ketone (MIBK) from acetone and/or isopropanol some methylisobutyl carbinol (MIBC) is formed in the hydrogenation step. Recycling the carbinol by-product to the hydrogenation reactor suppresses the formation of MIBC and in addition the recycled MIBC may act as a hydrogen donor. The MIBC molecules that give up hydrogen will become MIBK.

In order to prevent runaway temperatures in the hydrogenation reactor and also obtain 100% conversion of the mesityl oxide formed in the condensation zone, the reactor is preferably operated on a feed that contains only a small amount of mesityl oxide, i.e. about 5 wt. percent. This is accomplished by blending about 1 part of fresh mesityl oxide feed with 19 parts by weight of the product from the reactor. Under these conditions the product contains little or no mesityl oxide which is difficult to separate from MIBK by distillation.

Referring now to the drawing, in a preferred embodiment of the invention a mixture of pure acetone and hydrogen (in a molar ratio of 1 to 3) in line 5 is pumped through a furnace 6 to preheat the feed to 500 to 600° F. The preheated feed containing hydrogen is withdrawn from furnace 6 through line 7 and introduced into adiabatic condensation reactor 8, which is at approximately atmospheric pressure, at a space velocity of 0.25 to 0.75 v./v./hr. A substantial amount of the acetone in the feed is converted to mesityl oxide and MIBK. While the drawing shows only one reactor, a plurality of condensation reactors may be used. The reactor contains a fixed bed of catalyst pellets consisting of pure zinc oxide. The reaction mixture is withdrawn from reactor 8 via line 9 and is cooled to about 100° F. by cooling means 10 to condense most of the acetone, mesityl oxide and heavier products in the reaction mixture prior to introducing the mixture into the separation drum 11. The unreacted hydrogen gas is disengaged from the condensation products in drum 11 and recycled to the feed line 5 via lines 12 and 13. The recycle hydrogen usually contains a small quantity, e.g. about 0.25 mole percent, of acetone. The liquid product in drum 11 is pumped into a splitter 14 through line 15 wherein acetone, isopropanol and water are separated from mesityl oxide and the heavier products. Splitter 14 is operated at about 180° F. and 1 atmosphere pressure. The overhead product which contains acetone, isopropanol and water is withdrawn from splitter 14 through line 16 and introduced into a second splitter 17, which is also at atmospheric pressure and a somewhat lower temperature, to remove substantially all of the water from the overhead stream. The water is withdrawn from the splitter 17 through line 18 and the almost water-free ketone and alcohol are recycled to feed line 5 through line 19. The mesityl oxide (and heavier materials) is withdrawn from the bottom of splitter 14 through line 20 and introduced into hydrogenation reactor 21 at space velocities of 0.1 to 20 v./v./hr. where it contacts hydrogen introduced into reactor 21 through line 22. The hydrogenation takes place in the liquid phase at 165° F. to 300° F. under about 10 to 15 atmospheres pressure in the presence of a nickel or other hydrogenation catalyst that favors the saturation of double bonds. The hydrogenation reactor is equipped with a heat exchanger means in order to withdraw the heat of reaction from the vessel. If desired, the mesityl oxide and MIBK withdrawn from the bottom of splitter 14 may first be split in a tower (not shown) to remove the heavier materials (mesitylene, phorone, and isophorone) before it is introduced into hydrogenation reactor 21. The unreacted hydrogen is withdrawn from hydrogen reactor 21 through line 23 and recycled to the hydrogen feed stream in line 22. The hydrogenated mesityl oxide is withdrawn from the bottom of reactor 21 through line 24 and introduced into distillation tower 25 which is operated at atmospheric pressure to separate the MIBK product from unreacted mesityl oxide, MIBC and other high boiling materials. Pure MIBK (99.5%) is withdrawn from distillation tower 25 overhead through line 26. The bottom product of distillation tower 25 is withdrawn through line 27 and a part or all of the bottoms product in line 27 may be recycled to the hydrogenation reactor via valve 28 and lines 29 and 20, or it may be recycled to feed line 5 via line 13. If the hydrogenated product in line 24 contains a significant amount of acetone and isopropanol, these substances may be removed in a stripper (not shown) prior to introducing the hydrogenated product into distillation tower 25.

The condensation step of the present invention is an improvement over the process described and claimed in U.S. Patent 2,549,508 which issued to Henry O. Mottern on Apr. 17, 1951. A principal difference between the present process and the process described in the aforementioned patent is the character of the catalyst. The present process requires the use of a high density pelleted catalyst having a minimum dimension or diameter of at least $\frac{1}{32}$ inch. If particle sizes of less than $\frac{1}{32}$ inch are employed, the pressure drop across the bed will be unduly large and fines will cause clogging, etc., in the system. It has been found that when these minimum conditions are met higher yields of the condensation product and longer catalyst life are obtained. The density of the extruded or pressed catalyst particles should be at least 1.0 g./cc., but preferably not more than 3 g./cc. since very high density catalyst pellets have little or no pores and therefore a low surface area. The preferred catalyst density is about 1.2 to 2.5 g./cc. As mentioned above, in order to provide adequate contact between the catalyst and the reactants, the surface area should be at least 1 sq. meter/g. and preferably is about 2 to 4 sq. meters/g. The surface area, of course, can be increased by crushing the pelleted catalyst or including a small amount of a combustible material, such as coke or a fatty acid, e.g. stearic acid, with the catalyst prior to forming the pellets and thereafter burning out the combustible material.

The following example demonstrates how the process of the present invention may be carried out and its advantages over processes in which supported catalysts are used.

*Example*

Pelleted zinc oxide (95.0% pure) having a density of 1.2 g./cc. and an average particle size of $\frac{3}{16}$ inch is an excellent catalyst for condensing acetone to mesityl oxide in the vapor phase. The catalyst is 7 times more active than zinc oxide in char or 80 wt. percent zinc oxide–20 wt. percent zirconium oxide on char at a conversion rate of 15% and at moderately high temperatures. This is shown by the data in the following table which were obtained when acetone was condensed in an adiabatic reactor at 550° F. (inlet temperature) and atmospheric pressure:

| Catalyst: | V./v./hr. (correlated) required to give a 15% conversion |
|---|---|
| ZnO—ZnO$_2$ on char (20% total oxides) | 0.1 |
| ZnO on char (20% total oxide) | 0.1 |
| ZnO pellets | 0.7 |

Even more surprising is that its superiority to supported catalyst is its superiority to corresponding pilled zinc oxide-zirconium oxide catalysts. For instance, when a 20 wt. percent zirconium oxide–80 wt. percent zinc oxide catalyst was used in the above process the v./v./hr. required to give a 15% conversion was only 0.5. The catalyst life of the zinc oxide pellets is about three times that of the supported catalysts. Moreover, the catalyst can be regenerated to substantially its original level of activity.

A granular zinc oxide catalyst, prepared by dissolving zinc nitrate in water, gradually adding ammonium hydroxide to precipitate zinc hydroxide, filtering, drying and finally igniting the dried mass, was used in the condensation reaction to compare still another form of zinc oxide-containing catalyst with the pelletized zinc oxide. None of the acetone feed was converted (even at temperatures up to 700° F.) at atmospheric pressure and a feed rate of 0.5 v./v./hr. Similarly, powdered (<1 mm.) zinc oxide was an ineffective catalyst due to its packing tendency.

It is not intended to restrict the present invention to the foregoing example which is merely given to demonstrate the invention. It should only be limited to the appended claims in which it is intended to claim all of the novelty inherent in the invention as well as the modifications and equivalents coming within the scope and spirit of the invention.

What is claimed is.

1. A process for making a higher molecular weight ketone which comprises contacting vapors of a $C_3$ to $C_6$ saturated aliphatic oxygenated hydrocarbon feed selected from the group consisting of alcohols, ketones and mixtures thereof with a fixed bed of catalyst pellets consisting essentially of zinc oxide in a reaction zone maintained at temperatures between 300 and 700° F. for a sufficient time to convert said feed to said higher molecular weight ketone.

2. Process according to claim 1 in which the oxygenated hydrocarbon feed is contacted with the catalyst in the presence of hydrogen.

3. Process according to claim 1 in which the oxygenated hydrocarbon is isopropanol and the higher molecular weight ketone is mesityl oxide.

4. Process according to claim 1 in which the oxygenated hydrocarbon is acetone and the higher molecular weight ketone is mesityl oxide.

5. Process according to claim 1 in which the oxygenated hydrocarbon is a mixture of isopropanol and acetone and the higher molecular weight ketone is mesityl oxide.

6. Process according to claim 1 in which the catalyst pellets have an average diameter of $\frac{1}{32}$ to $\frac{1}{2}$ inch.

7. Process according to claim 1 in which the higher molecular weight ketone is unsaturated and it is hydrogenated to the corresponding saturated ketone.

References Cited

UNITED STATES PATENTS

| | | | |
|---|---|---|---|
| 2,064,254 | 12/1936 | Fuchs et al. | 260—593 X |
| 2,451,350 | 10/1948 | Mottern et al. | 260—593 |
| 2,549,508 | 4/1951 | Mottern | 260—593 |
| 2,549,844 | 4/1951 | Mottern | 260—596 X |
| 2,885,442 | 5/1959 | McCulloch | 260—596 |
| 3,153,068 | 10/1964 | Porter et al. | 260—593 |

OTHER REFERENCES

Zettlemoyer: Abstract of Application, Ser. No. 64,431, published Oct. 14, 1952, 663 O.G. 570.

LEON ZITVER, *Primary Examiner.*

L. WEINBERGER, D. D. HORWITZ, *Examiners.*

M. JACOB, *Assistant Examiner.*